US012701333B2

(12) United States Patent
Xue et al.

(10) Patent No.: US 12,701,333 B2
(45) Date of Patent: Aug. 4, 2026

(54) DEVICE AND METHOD FOR TRACKING EYEBALLS, AND DISPLAY DEVICE

(71) Applicant: Beijing Shiyan Technology Co., Ltd., Beijing (CN)

(72) Inventors: Yachong Xue, Beijing (CN); Xue Dong, Beijing (CN); Zhongyuan Wu, Beijing (CN); Jiankang Sun, Beijing (CN); Guixin Yan, Beijing (CN); Jiyang Shao, Beijing (CN)

(73) Assignee: BEIJING SHIYAN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/720,917

(22) PCT Filed: Mar. 28, 2022

(86) PCT No.: PCT/CN2022/083482
§ 371 (c)(1),
(2) Date: Jun. 17, 2024

(87) PCT Pub. No.: WO2023/184109
PCT Pub. Date: Oct. 5, 2023

(65) Prior Publication Data
US 2025/0063262 A1 Feb. 20, 2025

(51) Int. Cl.
*H04N 23/90* (2023.01)
*G06F 3/01* (2006.01)
*G06T 7/70* (2017.01)
*H04N 23/11* (2023.01)
*H04N 23/50* (2023.01)

(52) U.S. Cl.
CPC ............... *H04N 23/90* (2023.01); *G06T 7/70* (2017.01); *H04N 23/11* (2023.01); *H04N 23/50* (2023.01);
(Continued)

(58) Field of Classification Search
CPC ........ H04N 23/90; H04N 23/11; H04N 23/50; H04N 23/45; G06F 3/013; G06F 3/01;
(Continued)

(56) References Cited

U.S. PATENT DOCUMENTS 8,723,789 B1 * 5/2014 Rafii ........................ G06F 3/017
345/158
8,913,004 B1 * 12/2014 Bozarth ................ G06F 1/3234
348/78
(Continued)

FOREIGN PATENT DOCUMENTS

CN 108399001 A 8/2018
CN 108427503 B 3/2021
CN 113190115 A 7/2021

OTHER PUBLICATIONS

IInternational Search Report and Written Opinion mailed on Dec. 22, 2022, received for PCT Application PCT/CN2022/083482, filed on Mar. 28, 2022, 17 pages including English Translation.

*Primary Examiner* — David Tung
(74) *Attorney, Agent, or Firm* — XSENSUS LLP

(57) ABSTRACT

Provided is a device for tracking eyeballs. The device for tracking eyeballs includes: a support, a control assembly, a light filling assembly, and at least two eyeball tracking cameras; wherein the at least two eyeball tracking cameras are disposed on at least two different positions of the support, and at least parts of shooting ranges of the at least two eyeball tracking cameras are not overlapped; the light filling assembly is disposed on the support; and the control assembly is electrically connected to the at least two eyeball tracking cameras, and is configured to determine a gaze position of the eyeballs within the shooting ranges of the at least two eyeball tracking cameras.

16 Claims, 5 Drawing Sheets

(52) U.S. Cl.
 CPC .... *G06F 3/013* (2013.01); *G06T 2207/10024* (2013.01); *G06T 2207/10048* (2013.01); *G06T 2207/30201* (2013.01)

(58) Field of Classification Search
 CPC ............. G06T 7/70; G06T 2207/10024; G06T 2207/10048; G06T 2207/30201
 See application file for complete search history.

(56) References Cited

U.S. PATENT DOCUMENTS

| | | | | |
|---|---|---|---|---|
| 9,473,696 | B2 * | 10/2016 | Kamimura | H04N 23/611 |
| 10,346,995 | B1 * | 7/2019 | Ebrahimi Afrouzi | G01B 11/026 |
| 10,452,895 | B1 * | 10/2019 | Tang | H04N 23/56 |
| 10,466,779 | B1 | 11/2019 | Liu | |
| 10,698,481 | B1 | 6/2020 | Najafi Shoushtari et al. | |
| 2013/0063340 | A1 * | 3/2013 | Mondragon | G09G 5/00 345/156 |
| 2014/0055342 | A1 * | 2/2014 | Kamimura | G06V 40/193 345/156 |
| 2015/0146028 | A1 | 5/2015 | Choi | |
| 2015/0199003 | A1 * | 7/2015 | Zhang | G06F 3/013 345/156 |
| 2016/0004303 | A1 * | 1/2016 | Arar | G06F 3/013 345/156 |
| 2016/0018889 | A1 | 1/2016 | Skogo | |
| 2019/0236390 | A1 * | 8/2019 | Guo | G06V 40/67 |
| 2020/0379263 | A1 | 12/2020 | Fan et al. | |

* cited by examiner

DEVICE AND METHOD FOR TRACKING EYEBALLS, AND DISPLAY DEVICE

CROSS-REFERENCE TO RELATED APPLICATION

This application is a U.S. national stage of international application No. PCT/CN2022/083482, filed on Mar. 28, 2022, the disclosure of which is incorporated herein by reference in its entirety.

TECHNICAL FIELD

The present disclosure relates to the field of eyeball tracking technologies, and in particular, relates to a device and method for tracking eyeballs, and a display device.

BACKGROUND OF THE INVENTION

Devices for tracking eyeballs are devices capable of determining gaze positions of the eyeballs.

SUMMARY OF THE INVENTION

Embodiments of the present disclosure provide a device and method for tracking eyeballs, and a display device. The technical solutions are as follows.

In some embodiments of the present disclosure, a device for tracking eyeballs is provided. The device for tracking eyeballs includes: a support, a control assembly, a light filling assembly, and at least two eyeball tracking cameras; wherein the at least two eyeball tracking cameras are disposed on at least two different positions of the support, and at least parts of shooting ranges of the at least two eyeball tracking cameras are not overlapped;

the light filling assembly is disposed on the support; and the control assembly is electrically connected to the at least two eyeball tracking cameras, and is configured to determine a gaze position of the eyeballs within the shooting ranges of the at least two eyeball tracking cameras.

In some embodiments, in the at least two eyeball tracking cameras, an overlapping region is defined between the shooting ranges of two adjacent eyeball tracking cameras.

In some embodiments, a size of the overlapping region is greater than a size of predetermined eyeballs.

In some embodiments, the device for tracking eyeballs further includes: an image acquisition assembly; wherein the image acquisition assembly is disposed on the support and is electrically connected to the control assembly, and the shooting ranges of the at least two eyeball tracking cameras are within a shooting range of the image acquisition assembly.

In some embodiments, a gap is defined between edges of the shooting ranges of the at least two eyeball tracking cameras and an edge of the shooting range of the image acquisition assembly, wherein a size of the gap is greater than a size of a predetermined human face.

In some embodiments, the support is disposed outside a to-be-observed face and includes a mounting portion for disposing the to-be-observed face, and the control assembly is configured to determine the gaze position, within the shooting ranges of the at least two eyeball tracking cameras, of the eyeballs on the to-be-observed face.

In some embodiments, the control assembly is configured to determine the gaze position, within the shooting ranges of the at least two eyeball tracking cameras, of the eyeballs whose distance from the to-be-observed face meets a predetermined distance range on the to-be-observed face; and optical axes of the at least two eyeball tracking cameras are parallel and coplanar, a first plane determined based on the optical axes of the at least two eyeball tracking cameras is intersected with a vertical line running through a center of the to-be-observed face, and an intersection point is within the predetermined distance range.

In some embodiments, the intersection point is at a center of the predetermined distance range.

In some embodiments, the to-be-observed face is a display face of a display panel, the support includes the mounting portion for disposing the display panel, and the at least two eyeball tracking cameras are disposed under the mounting portion.

In some embodiments, the at least two eyeball tracking cameras are arranged in a horizontal direction on the support.

In some embodiments, the to-be-observed face is a display face of a display panel, and the support includes the mounting portion for disposing the display panel; and the device for tracking eyeballs further includes: an image acquisition assembly, wherein the image acquisition assembly is disposed on the support and under the mounting portion, and is electrically connected to the control assembly, and the shooting ranges of the at least two eyeball tracking cameras are within a shooting range of the image acquisition assembly.

In some embodiments, the light filling assembly includes at least two light filling lamps disposed on different positions of the support.

In some embodiments, the at least two light filling lamps are arranged in a horizontal direction on the support.

In some embodiments, the image acquisition assembly includes a color camera, and the eyeball tracking camera includes an infrared camera, wherein a resolution of the color camera is less than a resolution of the infrared camera.

In some embodiments of the present disclosure, a method for tracking eyeballs is provided. The method is applicable to a control assembly of a device for tracking eyeballs, and the device for tracking eyeballs includes: a support, a light filling assembly, and at least two eyeball tracking cameras; wherein the at least two eyeball tracking cameras are disposed on at least two different positions of the support, and at least parts of shooting ranges of the at least two eyeball tracking cameras are not overlapped; the light filling assembly is disposed on the support; and the control assembly is electrically connected to the at least two eyeball tracking cameras;

the method includes:

turning on the light filling assembly;

acquiring a first image acquired by the at least two eyeball tracking cameras; and determining gaze position of the eyeballs based on the first image.

In some embodiments, the device for tracking eyeballs further includes: an image acquisition assembly; wherein the image acquisition assembly is disposed on the support and is electrically connected to the control assembly;

prior to determining the gaze position of the eyeballs based on the first image, the method further includes:

acquiring a second image acquired by the image acquisition assembly;

acquiring facial information based on the second image; and determining positions of the eyeballs in the second image based on the facial information; and determining the gaze position of the eyeballs based on the first image includes:

determining positions of the eyeballs in the first image based on the positions of the eyeballs in the second image; and determining the gaze position of the eyeballs based on the positions of the eyeballs in the first image and the first image.

In some embodiments, the first image is an image acquired by a first eyeball tracking camera in the at least two eyeball tracking cameras, and determining the gaze position of the eyeballs based on the positions of the eyeballs in the first image and the first image includes:

acquiring, based on the positions of the eyeballs in the first image and the first image, positions of pupils of the eyeballs and positions of spots, on the eyeballs, of light emitted by the light filling assembly;

acquiring line-of-sight models of the at least two eyeball tracking cameras, wherein the line-of-sight models of the at least two eyeball tracking cameras are configured to determine the gaze position of the eyeballs based on the positions of the pupils of the eyeballs and the positions of the spots in the first image acquired by the at least two eyeball tracking cameras; and determining the gaze position of the eyeballs based on the line-of-sight models of the at least two eyeball tracking cameras, the positions of the pupils of the eyeballs, and the positions of the spots.

In some embodiments, determining the gaze position of the eyeballs based on the line-of-sight models of the at least two eyeball tracking cameras, the positions of the pupils of the eyeballs, and the positions of the spots includes:

determining at least one gaze position of the eyeballs based on the line-of-sight models of the at least two eyeball tracking cameras; and determining a target gaze position based on the at least one gaze position.

In some embodiments, the first image is an image acquired by a first eyeball tracking camera in the at least two eyeball tracking cameras, the light filling assembly includes at least two light filling lamps disposed on different positions of the support, and the first image includes two eyeballs; and acquiring, based on the positions of the eyeballs in the first image and the first image, the positions of the pupils of the eyeballs and the positions of the spots, on the eyeballs, of the light emitted by the light filling assembly includes:

acquiring, based on positions of the two eyeballs in the first image and the first image, positions of pupils of the two eyeballs and positions of spots, on the two eyeballs, of light emitted by the at least two light filling lamps; and acquiring the line-of-sight models of the at least two eyeball tracking cameras includes:

determining, based on each sample data, line-of-sight models corresponding to at least one sample data, wherein the sample data includes a position of a pupil of one of the two eyeballs and a position of a spot on the one of the two eyeballs, and the line-of-sight models corresponding to at least one sample data are line-of-sight models of the first eyeball tracking camera in the at least two eyeball tracking cameras.

In some embodiments of the present disclosure, a display device is provided. The display device includes: a display panel, a housing, and a device for tracking eyeballs; wherein the device for tracking eyeballs includes: a control assembly, a light filling assembly, an image acquisition assembly, and at least two eyeball tracking cameras; wherein the light filling assembly, the image acquisition assembly, and the at least two eyeball tracking cameras are disposed on the housing and face towards a light emitting direction of the display panel, the at least two eyeball tracking cameras are disposed on at least two different positions of the housing, and the control assembly is electrically connected to the at least two eyeball tracking cameras.

In some embodiments, the at least two eyeball tracking cameras are disposed on the housing and under the display panel, and arranged in a horizontal direction.

In some embodiments, a display face of the display panel is rectangular, an edge of the display face is parallel to the horizontal direction, and in the at least two eyeball tracking cameras, distances between any two adjacent eyeball tracking cameras are equal.

In some embodiments, the at least two eyeball tracking cameras and the display face of the display panel are coplanar, a number of the eyeball tracking cameras is three, the distance between two adjacent eyeball tracking cameras of the three eyeball tracking cameras meets:

$$\begin{cases} 2*\tan\left(\dfrac{\alpha}{2}\right)*D1 + 2*L \ge W1 \\ 2*\tan\left(\dfrac{\alpha}{2}\right)*D2 + 2*L \ge W2 - e*2 \, ; \\ 2*\tan\left(\dfrac{\alpha}{2}\right)*D1 - L \ge p \end{cases}$$

wherein L is used to determine the distance, p is determined based on a width of the eyeball, e is determined based on a distance between two eyeballs, $\alpha$ represents a horizontal field of view of the eyeball tracking camera, D1 and D2 respectively represent a minimum distance and a maximum distance between a predetermined target region for eyeball tracking of the eyeball tracking camera and the display face in a direction perpendicular to the display face; wherein $$W1 = 2*\tan\left(\frac{\theta}{2}\right)*D1, \text{ and } W2 = 2*\tan\left(\frac{\theta}{2}\right)*D2,$$

wherein $\theta$ represents a whole horizontal field of view of the three predetermined eyeball tracking cameras.

In some embodiments, optical axes of the three eyeball tracking cameras are parallel and coplanar, a first plane determined based on the optical axes of the three eyeball tracking cameras is intersected with a vertical line running through a center of the display face, and an intersection point is within the predetermined target region.

In some embodiments, the intersection point is at a center of the target region in the direction perpendicular to the display face, and the eyeball tracking camera meets:

$$b = \text{atan}\left(\frac{D1 + D2}{2*k}\right);$$

wherein b is used to determine an included angle between the optical axis of the eyeball tracking camera and the display face, and k represents a distance between the center of the display face and the eyeball tracking camera in a vertical direction.

In some embodiments, the image acquisition assembly is disposed on the housing and under the display panel, and distances between the image acquisition assembly and two ends of lower edges of the display face are equal.

In some embodiments, the housing includes a base and a frame body disposed on the base, and the light filling assembly, the image acquisition assembly, and the at least two eyeball tracking cameras are disposed on the frame body.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION OF THE INVENTION

Figure 1:
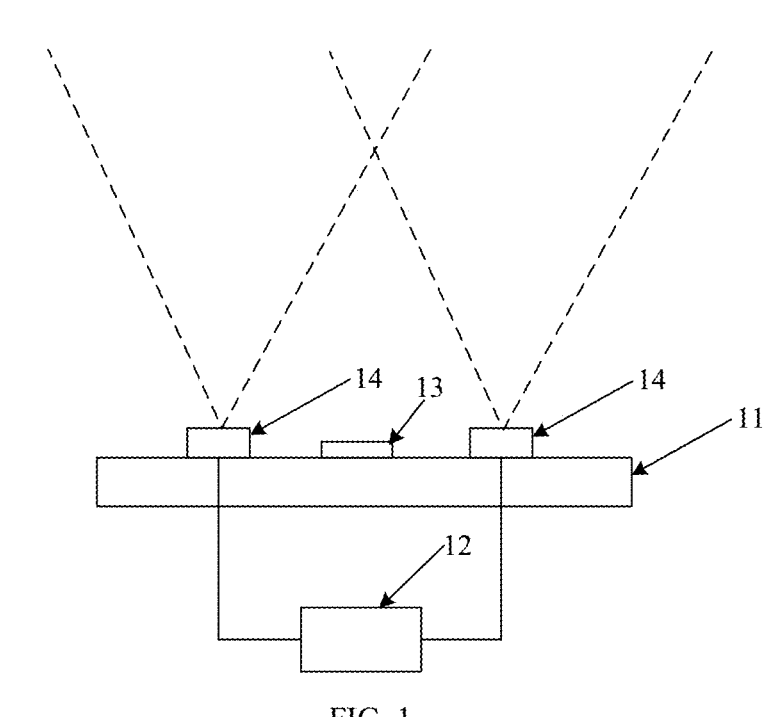
FIG. 1 is a schematic structural diagram of a device for tracking eyeballs according to some embodiments of the present disclosure.

To make the objectives, technical solutions, and advantages of the present disclosure clearer, the embodiments of the present disclosure are further described in detail hereinafter with reference to the accompanying drawings.

The current device for tracking eyeballs generally includes an eyeball tracking camera and a light filling assembly. The eyeball tracking camera is capable of shooting images within a range, and the device for tracking eyeballs is capable of determining the gaze position of the eyeballs based on positions of pupils of the eyeballs in the image and positions of spots of the light filling assembly on the eyeballs. A range that can be shot by the eyeball tracking camera is a tracking range of the device for tracking eyeballs. In the case that the eyeballs are within the tracking range, the device for tracking eyeballs is capable of determining the gaze position of the eyeballs.

In some practices, the device for tracking eyeballs merely includes one eyeball tracking camera. Due to particular functions of the eyeball tracking camera, a shooting range (the shooting range is determined based on a field of view of the eyeball tracking camera and a range of a predetermined distance for eyeball tracking; and for a same range of the tracking distance, the greater the field of view, the greater the shooting range, and the less the field of view, the less the shooting range) of the conventional eyeball tracking camera is generally less. For example, the field of view (FOV) is generally less than 30°, such that the tracking range (the tracking range is the same as the shooting range of the eyeball tracking camera) of the device for tracking eyeballs is less, and the eyeballs are prone to escaping the tracking range of the device for tracking eyeballs. Thus, user experience of the device for tracking eyeballs is poor. The predetermined distance is a distance between the eyeball and the eyeball tracking camera, the range of the predetermined distance is a range of the predetermined distance, and the eyeball tracking camera tracks eyeballs in the range and within the field of view.

The current eyeball tracking camera is generally an infrared camera. However, as the infrared camera of a great field of view is difficult to be manufactured, usually is customized, and the cost is high. Illustratively, taking a 32-inches screen as an example, an observing distance is 400 mm to 700 mm, an observing range is 60° (that is, a minimum included angle between the observing line-of-sight and the screen is greater than) 30°, a pupil positioning error is 0 pixel (p), and a precision of calculating the line-of-sight is less than ±1°. It can be acquired based on these parameters that a number of pixels in an image shot by the eyeball tracking camera in a range of 1° is required to be up to 45.2p. That is, the precision of calculating the line-of-sight is less than ±1° on the premise that pixels per degree (PPD) (the pixels per degree refers to a number of pixel points in the field of view in each 1°) of the image acquired by the infrared camera is at least 45.2. That is, where a horizontal range of tracking the eyeballs is 60°, a corresponding transverse resolution is required to be up to 60*45.2, that is 2712p. The currently available infrared camera of such high resolution and up to 120 frame per second (fps) (the eyeball tracking camera generally requires high fps) is difficult to be manufactured, and the cost is high.

The embodiments of the present disclosure provide a device and method for tracking eyeballs, and a display device, which can solve the above problem.

FIG. 1 is a schematic structural diagram of a device for tracking eyeballs according to some embodiments of the present disclosure. A part or all of the device for tracking eyeballs 10 is integrated in a display device. The device for tracking eyeballs 10 includes: a support 11, a control assembly 12, a light filling assembly 13, and at least two eyeball tracking cameras 14.

The at least two eyeball tracking cameras 14 are disposed on at least two different positions of the support 11, and at least parts of shooting ranges (f1 and f2) of the at least two eyeball tracking cameras 14 are not overlapped.

The light filling assembly 13 is disposed on the support 11.

The control assembly 12 is electrically connected to the at least two eyeball tracking cameras 14, and is configured to determine gaze position of the eyeballs within the shooting ranges of the at least two eyeball tracking cameras 14.

FIG. 1 shows a structure of the device for tracking eyeballs including two eyeball tracking cameras. In some embodiments, a number of the eyeball tracking cameras is more, for example, three, four, five, six, seven, eight, and the like, which is not limited in the embodiments of the present disclosure.

It can be seen from FIG. 1 that an overlapping region is defined between the shooting ranges f1 and f2 of the two eyeball tracking cameras 14, and parts of shooting ranges f1 and f2 of the two eyeball tracking cameras 14 are not overlapped. The two eyeball tracking cameras 14 form a greater shooting range.

In summary, in the device for tracking eyeballs in the embodiments of the present disclosure, at least two eyeball tracking cameras are disposed, and at least parts of the shooting ranges of the at least two eyeball tracking cameras are not overlapped. Then, the at least two eyeball tracking cameras form a greater tracking range, and the control assembly determines the gaze position of the eyeballs within the greater tracking range, such that a problem of a less tracking range of the device for tracking eyeballs in some practices is solved, and an effect of increasing the tracking range of the device for tracking eyeballs is achieved.

In addition, the device for tracking eyeballs achieves a greater tracking range of the eyeballs by a plurality of eyeball tracking cameras with less shooting ranges without using an eyeball tracking cameras with a greater shooting range, such that the manufacturing difficulty and cost of the device for tracking eyeballs are reduced.

Figure 2:
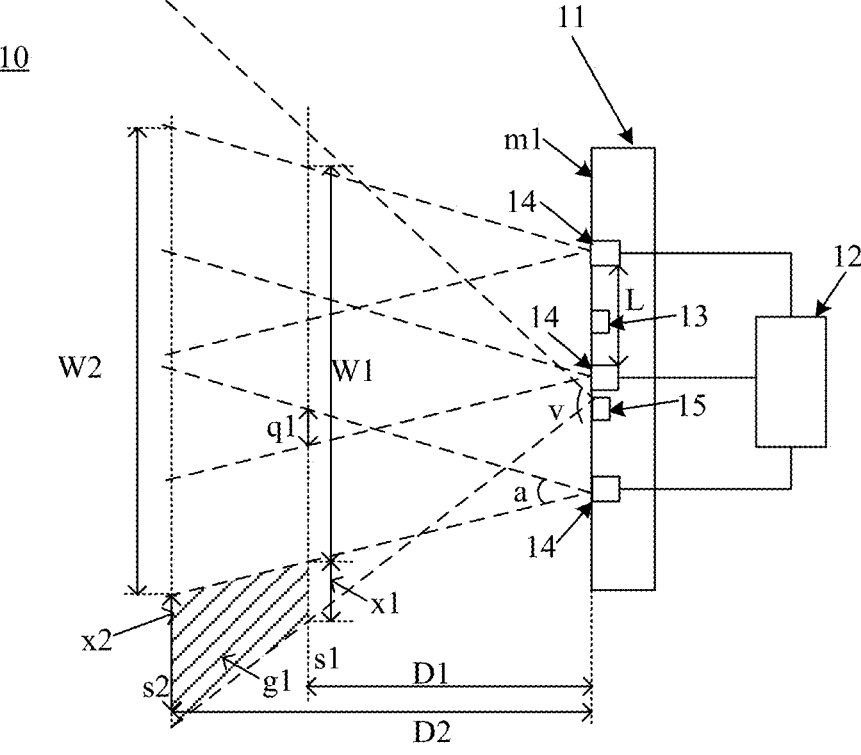
FIG. 2 is a schematic structural diagram of another device for tracking eyeballs according to some embodiments of the present disclosure.

FIG. 2 is a schematic structural diagram of another device for tracking eyeballs according to some embodiments of the present disclosure. The device for tracking eyeballs is adjusted based on the device for tracking eyeballs shown in FIG. 1.

In some embodiments, in the at least two eyeball tracking cameras 14, an overlapping region q1 is defined between the shooting ranges of two adjacent eyeball tracking cameras 14. As such, a combined shooting range formed by the shooting ranges of the at least two eyeball tracking cameras 14 is a consecutive range, such that in the case that the eyeballs are located between the shooting ranges of two adjacent eyeball tracking cameras 14, the problem of not tracking the eyeballs is avoided.

A size of the overlapping region q1 is greater than a size of predetermined eyeballs. Specifically, a size of the overlapping region q1 at a minimum position is greater than or equal to a size of the predetermined eyeballs at a maximum position. That is, the overlapping region q1 of the shooting ranges of adjacent eyeball tracking cameras 14 accommodates at least one eyeball. As such, in adjacent eyeball tracking cameras 14, any eyeball tracking camera 14 is ensured to acquire a complete image of the eyeball, the image of the eyeballs is facilitated to be analyzed, and the problem that the eyeball tracking camera 14 merely acquires a part of the image of the eyeballs and the image of the eyeballs is difficult to be analyzed is avoided. The size of predetermined eyeballs refers to a conventional size of the eyeballs. For example, the size of predetermined eyeballs is greater than or equal to a conventional maximum size of the eyeballs.

FIG. 2 shown a structure of three eyeball tracking cameras, which is not limited in the embodiments of the present disclosure.

Figure 3:
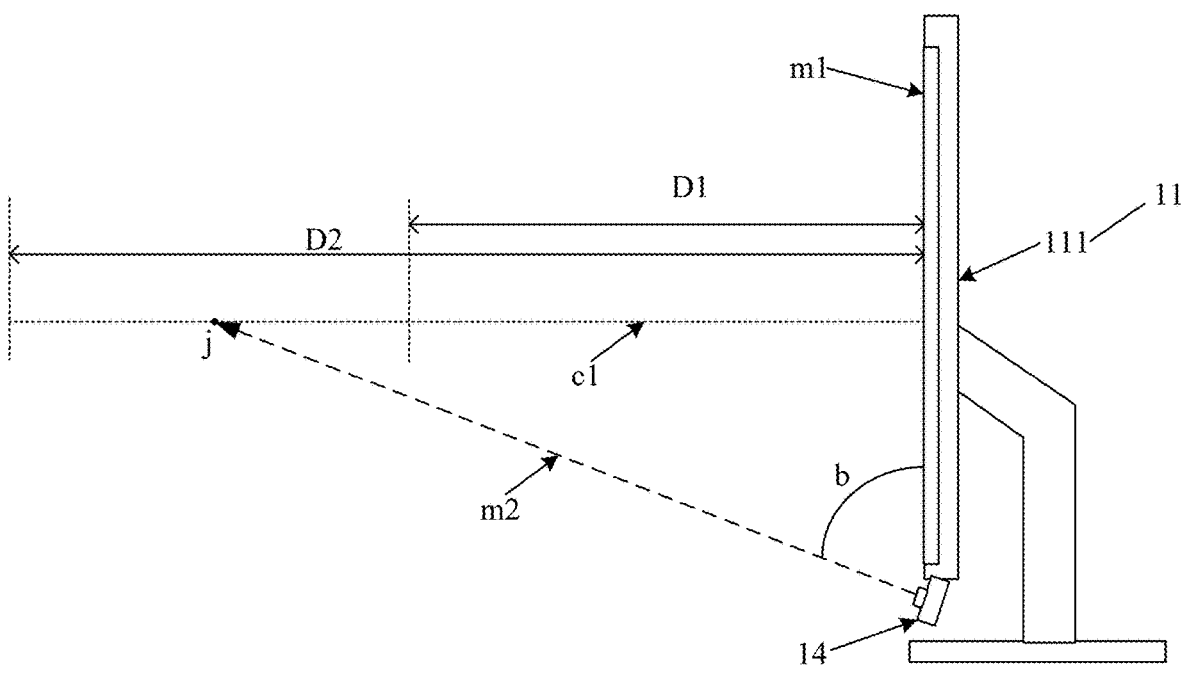
FIG. 3 is a bottom view of the device for tracking eyeballs shown in FIG. 2.

FIG. 3 is a bottom view of the device for tracking eyeballs shown in FIG. 2 (the control assembly is not shown in FIG. 3). The support 11 includes a mounting portion 111 for disposing a to-be-observed face m1, and the control assembly is configured to determine the gaze position, within the shooting ranges of the at least two eyeball tracking cameras, of the eyeballs on the to-be-observed face m1. In some embodiments, the to-be-observed face m1 is a display face of a display panel, and then the mounting portion 111 is configured to dispose a mounting portion of the display panel.

In some embodiments, the control assembly is configured to determine the gaze position, within the shooting ranges of the at least two eyeball tracking cameras 14, of the eyeballs whose distance from the to-be-observed face m1 meets a predetermined distance range on the to-be-observed face m1. As shown in FIG. 3, the predetermined distance range is a range where a vertical distance between the eyeballs and the to-be-observed face m1 is greater than D1 and less than D2. It should be noted that as the eyeball tracking camera is disposed obliquely relative to the to-be-observed face m1 in such structure, the predetermined distance range is a predetermined distance range acquired by converting based on an oblique angle. The converted predetermined distance range is a range of the distance in the direction perpendicular to the to-be-observed face m1.

Optical axes of the at least two eyeball tracking cameras 14 are parallel and coplanar, a first plane m2 determined based on the optical axes of the at least two eyeball tracking cameras 14 is intersected with a vertical line c1 running through a center of the to-be-observed face, and an intersection point j is within the predetermined distance range. That is, a vertical distance between the intersection point j and the to-be-observed face m1 is greater than D1 and less than D2.

In some embodiments, the at least two eyeball tracking cameras 14 are disposed under the mounting portion 111, and then the at least two eyeball tracking cameras 14 are disposed under the to-be-observed face m1. The term "under" herein refers to a side, facing towards the ground, of the to-be-observed face m1. As the eyeball has a structure of eyelashes and eyelid, the eyeball tracking camera 14 is blocked by the structure of eyelashes and eyelid in the case that the eyeball tracking camera 14 is in a high position, such that a complete and clear image of the eyeballs is difficult to be acquired. In the device for tracking eyeballs in the embodiments of the present disclosure, the eyeball tracking cameras 14 are disposed under the mounting portion 111, that is, at a lower position. In the case that the eyeballs observe the to-be-observed face m1, a possibility of blocking the eyeball tracking cameras 14 by the structure of eyelashes and eyelid is less, a possibility of acquiring the complete and clear image of the eyeballs is great, and thus the gaze position of the eyeballs is facilitated to be determined. The intersection point j is at a center of the predetermined distance range. That is, the vertical distance between the intersection point j and the to-be-observed face m1 is:

$(D1+D2)/2$. A possibility of the eyeball being at the position is great. In the case that the intersection point j is at the position, a sharpness of the acquired image of the eyeballs is further improved (the closer the eyeballs to the eyeball tracking camera, the sharper the acquired image of the eyeballs).

In some embodiments, the at least two eyeball tracking cameras 14 are arranged on the support 11 in a horizontal direction. That is, the at least two eyeball tracking cameras 14 are arranged on the support 11 in a direction parallel to a horizontal face. In the case that the eyeballs observe the ace to be observed (for example, the display face of the display device), the eyeballs generally move in the direction parallel to the horizontal face, a moving distance is less even though the eyeballs move in a direction perpendicular to the horizontal face, and thus the moving distance is difficult to escape the shooting range of the eyeball tracking cameras 14 in the vertical direction. Thus, in the embodiments of the present disclosure, the at least two eyeball tracking cameras 14 are arranged on the support 11 in the horizontal direction, such that each eyeball tracking camera 14 is maximally used, and the tracking range formed by the shooting ranges of the at least two eyeball tracking cameras 14 is further increased.

Figure 4:
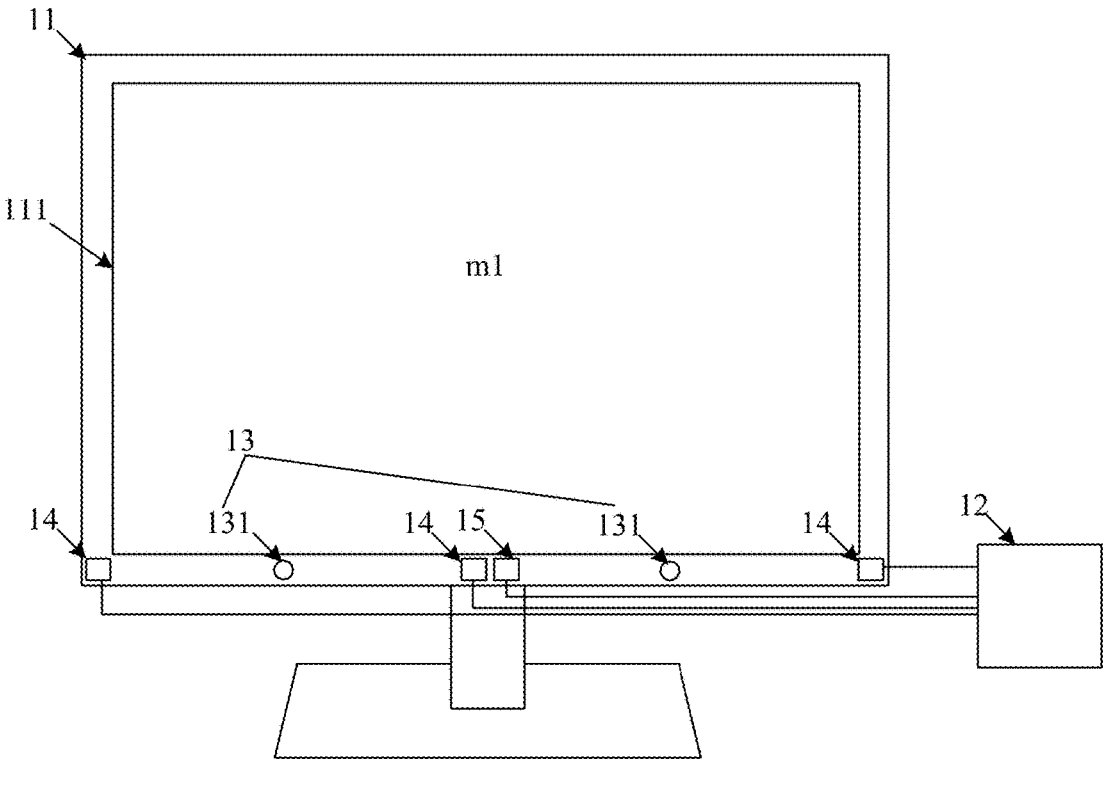
FIG. 4 is a left view of the device for tracking eyeballs shown in FIG. 3.

FIG. 4 is a left view of the device for tracking eyeballs shown in FIG. 3. The device for tracking eyeballs further includes: an image acquisition assembly 15. The image acquisition assembly 15 is disposed on the support 11 and is electrically connected to the control assembly 12, and the shooting ranges of the at least two eyeball tracking cameras 14 are within a shooting range of the image acquisition assembly 15. That is, the shooting range of the image acquisition assembly 15 is greater than and includes the shooting ranges of the at least two eyeball tracking cameras 14. In the case that the predetermined distance range is determined, a field of view of the image acquisition assembly 15 is greater than a field of view of any eyeball tracking camera 14. Specifically, referring to FIG. 2, a field of view v of the image acquisition assembly 15 is greater than a field of view a of any eyeball tracking camera 14, and at a closest distance (a position whose vertical distance from the to-be-observed face m1 is D1) and a furthest distance (a position whose vertical distance from the to-be-observed face m1 is D2) in the predetermined distance range, a region capable of being shot by the image acquisition assembly 15 is greater than a region capable of being shot by the at least two eyeball tracking cameras 14.

The image acquisition assembly 15 is not an eyeball tracking camera, and thus has a great field of view with less manufacturing difficulty and cost. Thus, the device for tracking eyeballs is provided with an image acquisition assembly 15 with a great field of view to match the at least two eyeball tracking cameras 14, such that the gaze position of the eyeballs is determined. Illustratively, as the field of view of the eyeball tracking camera is less, it is difficult to contain the whole facial image in the acquired image, and then it is difficult to determine the positions of the eyeballs based on the facial image. The field of view of the image acquisition assembly 15 is great, and the possibility of only containing the whole facial image in the acquired image is great, such that the difficulty of determining the positions of the eyeballs based on the facial image is reduced, and the precision of the determined the positions of the eyeballs is improved, thereby facilitating the device for tracking eyeballs determining the gaze position of the eyeballs.

In some embodiments, a gap g1 is present between edges of the shooting ranges of the at least two eyeball tracking cameras 14 and an edge of the shooting range of the image acquisition assembly 15. A size of the gap g1 is greater than a size of a predetermined human face. As such, the complete facial image is ensured to be acquired by the image acquisition assembly 15 on the edges of the shooting ranges of the at least two eyeball tracking cameras 14. The size of the gap g1 refers to a predetermined standard human face model. For example, the size in a horizontal direction is 135 mm or greater than 135 mm.

In some embodiments, the size of the gap g1 is greater than the size of the predetermined human face at a position of a minimum distance (that is, s1 in FIG. 2) of the predetermined distance range of the eyeball tracking camera. As the shooting range of the eyeball tracking camera 14 and the image acquisition assembly 15 are fan-shaped in the horizontal direction, and the field of view of the image acquisition assembly 15 is greater than the field of view of the eyeball tracking camera 14, the size (a size in a direction parallel to the to-be-observed face m1) of the gap g1 (that is, the shaded region in FIG. 2) is gradually increased in a direction away from the to-be-observed face m1. For example, the size x1 of the gap g1 at the position of the minimum distance s1 of the predetermined distance range of the eyeball tracking camera is less than the size x2 at a position of a maximum distance s2 in FIG. 2. On this basis, in the case that the size of the gap g1 at the position of the minimum distance of the predetermined distance range of the eyeball tracking camera is greater than the size of the predetermined human face, the sizes of the gap g1 between the edge of the shooting range of the image acquisition assembly 15 and the edges of the shooting ranges of the at least two eyeball tracking cameras 14 are greater than the size of the predetermined human face at various positions of in the predetermined distance range.

In some embodiments, referring to FIG. 4, the image acquisition assembly 15 is disposed on the support 11 and under the mounting portion 111, and is electrically connected to the control assembly 12. The term "under" herein refers to the side, facing towards the ground, of the to-be-observed face m1. As the eyeball has the structure of eyelashes and eyelid, the image acquisition assembly 15 is blocked by the structure of eyelashes and eyelid in the case that the image acquisition assembly 15 is in a high position, such that a complete and clear image of the eyeballs is difficult to be acquired. In the device for tracking eyeballs in the embodiments of the present disclosure, the image acquisition assembly 15 is disposed under the mounting portion 111, that is, at a lower position. In the case that the eyeballs observe the to-be-observed face m1, a possibility of blocking the image acquisition assembly 15 by the structure of eyelashes and eyelid is less, a possibility of acquiring the complete and clear image of the eyeballs is great, and thus the gaze position of the eyeballs is facilitated to be determined.

In some embodiments, the image acquisition assembly 15 includes a color camera, and the eyeball tracking camera 14 includes an infrared camera. A resolution of the color camera is less than a resolution of the infrared camera. As the color camera is used to determine the positions of the eyeballs, but not the positions of the pupils and the spots, the resolution is less, and the color camera with a less resolution is disposed in the image acquisition assembly 15 to achieve the function. In addition, the color camera is a conventional camera with less manufacturing difficulty, and the cost is less in the case that the resolution is less, such that the cost of the device for tracking eyeballs is reduced. Illustratively, the resolution of the color camera is 640*480, a frame rate is 120 fps, and a horizontal field of view is 90°.

Referring to FIG. 3, the light filling assembly 13 includes at least two light filling lamps 131 disposed on different positions of the support 11. Light emitted by the light filling lamp form a spot on the eyeball. As a position of the light filling lamp and the position of the eyeball tracking camera are known, the gaze position of the eyeballs is determined based on the position of the pupil of the eyeball and the position of the spot of the light emitted by the light filling lamp on the eyeball in the image acquired by the eyeball tracking camera, and the position of the light filling lamp and the eyeball tracking camera in some methods. However, as positions and angles of the eyeballs, and the like, the image acquired by the eyeball tracking camera does not include the complete image of the eyeballs, such that the spot is loss, and then the gaze position of the eyeballs is not determined.

In the embodiments of the present disclosure, a plurality of light filling lamps are disposed, the plurality of light filling lamps are disposed on different positions, and thus a plurality of spots generated based on the light emitted by the plurality of light filling lamps on the eyeballs are located on different positions. A possibility of simultaneously losing the plurality of spots is less, and thus the possibility of successfully determining the gaze position of the eyeballs is improved.

It should be noted that in the case that the eyeball tracking camera includes the infrared camera, the light filling lamp is an infrared light filling lamp.

In some embodiments, the at least two light filling lamps 131 are arranged on the support 11 in the horizontal direction. It can be seen from above description that the eyeballs move in the horizontal direction relative to the to-be-observed face m1, and the light filling lamp 131 covers a greater range of the movement of the eyeballs in the case that the at least two light filling lamps 131 are arranged on the support 11 in the horizontal direction, such that the tracking range of the device for tracking eyeballs is improved.

In summary, in the device for tracking eyeballs in the embodiments of the present disclosure, at least two eyeball tracking cameras are disposed, and parts of the shooting ranges of the at least two eyeball tracking cameras are not overlapped. Then, the at least two eyeball tracking cameras form a greater tracking range, and the control assembly determines the gaze position of the eyeballs within the greater tracking range, such that a problem of a less tracking range of the device for tracking eyeballs in some practices is solved, and an effect of increasing the tracking range of the device for tracking eyeballs is achieved.

In addition, the device for tracking eyeballs achieves a greater tracking range of the eyeballs by a plurality of eyeball tracking cameras with less shooting ranges without using an eyeball tracking cameras with a greater shooting range, such that the manufacturing difficulty and cost of the device for tracking eyeballs are reduced.

An entire device formed by disposing both the device for tracking eyeball and the display panel on the support is shown in the embodiments of the present disclosure, and the device for tracking eyeball and the display panel are also separate structure in some embodiments, which is not limited in the embodiments of the present disclosure.

In some embodiments, the device for tracking eyeball in the embodiments of the present disclosure includes three infrared cameras, two infrared light-emitting diode (LED) lamps, one color camera, and a control assembly. The color camera has a less resolution and thus is used to acquire the facial image, and parameters are: a resolution of 640*480, a frame rate of 120 fps, and a horizontal field of view of 90°. The three infrared cameras have great resolutions and thus are used to acquire the image of the pupils, and the three cameras are short for IR1, IR2, and IR3 with parameters: a resolution of 1280*720, a frame rate of 120 fps, and a horizontal field of view of 30°. One infrared LED lamp with a wavelength of 850 nm is disposed between adjacent infrared cameras, and is used for infrared light filling. The entire hardware layout is referred to FIG. 4.

The process of determining theoretical parameters of the eyeball tracking camera includes the following.

Figure 5:
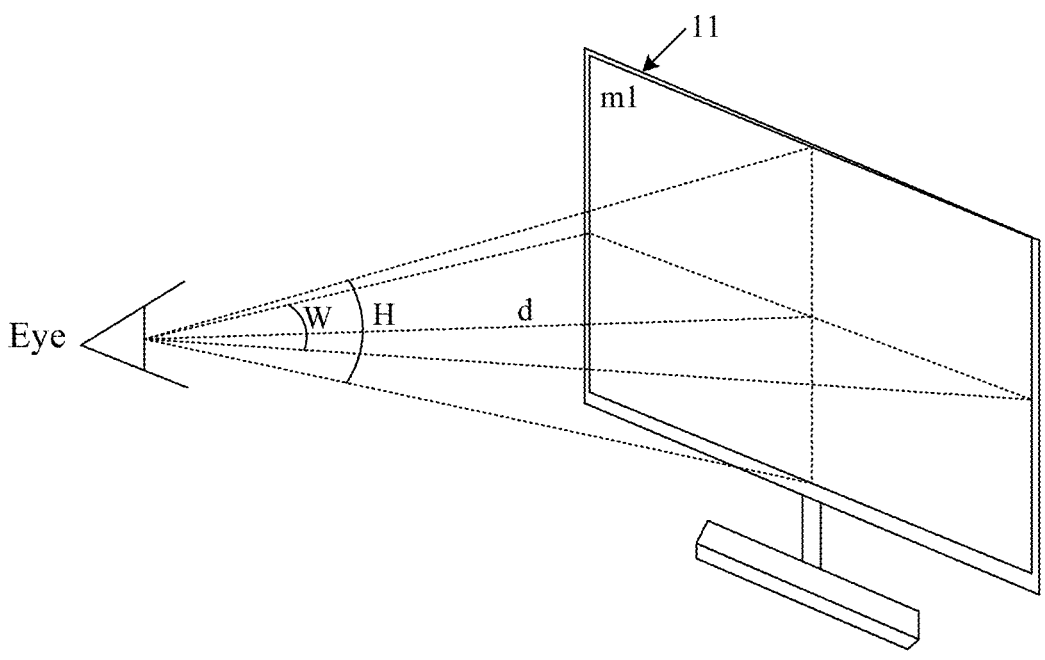
FIG. 5 is a schematic diagram of an eyeball observing a display face according to some embodiments of the present disclosure.

Referring to FIG. 5, FIG. 5 is a schematic diagram of an eyeball observing a display face according to some embodiments of the present disclosure. A size of the display face m1 of the screen is P (the size is a length of a diagonal of the display face of the screen, and the embodiments are illustrated by taking a screen with an aspect ratio of 16:9 as an example), a horizontal observing range of the eyeball is H°, a longitudinal observing range of the eyeball is V°, a predetermined distance between the eyeball and the display face m1 of the screen is (D1, D2), a radius of the eyeball is r.

At a position d away from the screen, an angle of the screen in the eye is $\theta\_H * \theta\_V$, as shown in FIG. 2.

In this case, the width*height of the screen are:

$$W = \frac{16*P}{\sqrt{16^2 + 9^2}} \approx 2.21P; H = \frac{9*P}{\sqrt{16^2 + 9^2}} \approx 1.24P;$$

The angle of the screen in the eye is:

$$\theta_H = 2 * \arctan\left(\frac{W}{2*d}\right), \theta_V = 2 * \arctan\left(\frac{H}{2*d}\right);$$

The following is illustrated by taking the calculation of the transverse resolution as an example, the head is kept still, the eyeballs move from a left side of the screen to a right side of the screen, and an arc length of the transverse movement of the pupils is C:

$$C = 2\pi r * \frac{\theta_H}{360°};$$

An error of positioning the pupil is n pixels, and a required precision of calculating the light-of-sight is e°. Thus, in the case that the pupils move from the left side of the screen to the right side of the screen, a rotation angle of the pupils is $\theta_H$, and a number of the moved pixels is min the case that the gaze position of the pupils moves in the horizontal direction:

$$m = \frac{\theta_H}{e}(2n + 1);$$

the angle of the arc length of the movement of the pupils in the camera is $\alpha$, and the formula is:

$$\alpha = 2 * \arctan\left(\frac{C}{2*\sqrt{d^2 + \left(\frac{1.24P}{2}\right)^2}}\right) \approx 2 * \arctan\left(\frac{C}{2d}\right);$$

assuming that the transverse resolution of the camera is M, based on a proportional relationship of the number m of the pixels of movement of the eyeball shot by the camera, the angle $\alpha$ of the movement of the eyeball in the camera, and the transverse field of view H of the camera, it can be seen that:

$$\frac{\alpha}{H} = \frac{m}{M};$$

in the embodiments of the present disclosure, by taking a 32-inches screen as an example, the observing distance is set as 400 mm to 700 mm, the observing distance is equal to the predetermined distance for tracking eyeballs of the device for tracking eyeballs, the observing angle range is 60°, the pupil positioning error is 0 pixel, and the precision of calculating the line-of-sight is less than ±1°. It can be seen based on the known parameters and above descriptions that a number of pixels in an image shot by the eyeball tracking camera in a range of 1° is required to be up to 45.2. That is, the precision of calculating the line-of-sight is less than ±1° on the premise that PPD of the eyeball tracking camera is at least 45.2. That is, where a transverse range of tracking the eyeballs is 60°, a corresponding transverse resolution is required to be up to 60*45.2, that is 2712. The currently available infrared camera of such high resolution and the frame rate up to 120 fps is less, and the cost is high.

The function is achieved by two eyeball tracking cameras with less field of view and a color camera in the embodiments of the present disclosure.

For the transverse layout, as shown in FIG. 2, FIG. 3, and FIG. 4, the optical axes of the image acquisition assembly 15 (including the color camera) and the three eyeball tracking cameras (the infrared cameras) point dead ahead, and the field of view of the color camera is great, and thus the shooting range of the color camera covers all shooting ranges of the infrared cameras.

The predetermined distance for tracking eyeballs of the device for tracking eyeballs is predetermined as 400 mm to 700 mm, a required range of tracking the eyeballs is ±30°. That is, the requirements of parameters of the device for tracking eyeballs are that the light-of-sight is calculated in the case that the movement of the head is up to ±30° at the closest distance of 400 mm and at the 700 mm. At a position of 400 mm, an overlapping region is defined between the shooting ranges of adjacent eyeball tracking cameras, a width of the overlapping region is greater than a width of one eye, and a height of the overlapping region is greater than a height of one eye. For a standard human face (a standard human face determined in the present field, which has standard parameters and is used for various calculations related to the human face), a width of one eye is about 30 mm, and a height of one eye is about 20 mm. Thus, a transverse overlapping region of adjacent eyeball tracking cameras is at least 30 mm, and a longitudinal overlapping region is at least 20 mm.

Assuming that a transverse distance of adjacent eyeball tracking cameras is L, a width of the overlapping region q1 is p (the width of one eye) at a position of a minimum distance s1 in the predetermined distance range of the device for tracking eyeballs, the transverse FOV of the eyeball tracking camera is α, an entire field of view of the device for tracking eyeballs is θ. At the position of the minimum distance s1 in the predetermined distance range of the device for tracking eyeballs, a transverse tracking width is ≥W1. At a position of a maximum distance s2, a transverse tracking width is ≥W2. The tracking width is a width of a position at which the eyeball tracking camera performs eyeball tracking (a size in the horizontal direction). Thus, at a position of s1, to meet the field of view of θ, the transverse tracking width is at least:

$$W1 = 2*\tan\left(\frac{\theta}{2}\right)*D1 \approx 462 \text{ mm};$$

at a position of s2, the transverse tracking width is at least:

$$W2 = 2*\tan\left(\frac{\theta}{2}\right)*D2 \approx 808 \text{ mm};$$

to reduce the requirements of the field of view of the eyeball tracking camera (the requirement of the resolution of the camera is reduced by reducing the FOV of the camera), at the position of s2, the settings are that the right eye is used to track at a left boundary in the horizontal direction and the left eye is used to track at a right boundary in the horizontal direction. As such, in the case that the head moves to the boundary, it is not necessary to shoot both eyes, but only one eye, by the eye tracking camera.

The widths of the transversely shooting of the three eye tracking cameras required to be ≥W1 at the position of s1, and be ≥W2 at the position of s2, as shown in FIG. 2. Then, $$\begin{cases} 2*\tan\left(\frac{\alpha}{2}\right)*D1 + 2*L \geq W1 \\ 2*\tan\left(\frac{\alpha}{2}\right)*D2 + 2*L \geq W2 - e*2; \\ 2*\tan\left(\frac{\alpha}{2}\right)*D1 - L \geq p \end{cases}$$

wherein e represents a distance between two eyeballs, for example, 65. Thus, it can be seen that α≥28°. In the case that α=28°, L is equal to 166 mm.

That is, the distance between adjacent eyeball tracking cameras 14 in the horizontal direction is 166 mm, as shown in FIG. 2. The size of the overlapping region in the horizontal direction is 30 mm, and the longitudinal field of view is 16° in the case that the transverse to longitudinal ratio of the camera is 16:9. It can be seen from above description that a required PPD of the eyeball tracking camera is 45.2, a transverse resolution is 1265, and a longitudinal resolution is 723. Thus, the resolution of the eyeball tracking camera is just greater than 1265*723. Compared with a transverse resolution greater than 2712 of the eyeball tracking camera in some practices, the eyeball tracking camera in the embodiments of the present disclosure greatly reduces the requirements of the transverse resolution (for the requirements of the longitudinal resolution, the longitudinal resolution of the eyeball tracking camera in the embodiments of the present disclosure is the same as the longitudinal resolution of the eyeball tracking camera in some practices). Illustratively, a resolution of one eyeball tracking camera in the device for tracking eyeballs a in the embodiments of the present disclosure is 1280*800.

The setting orientations and positions of the three eyeball tracking cameras 14 and the image acquisition assembly 15 are shown in FIG. 3.

The method for determining the orientations of the cameras are that optical axes of at least two eyeball tracking cameras 14 are parallel and coplanar, a first plane m2 determined based on the optical axes of the at least two eyeball tracking cameras 14 is intersected with a vertical line c1 running through a center of the to-be-observed face, and an intersection point j is within the predetermined distance range D1 to D2, for example, a position of a middle distance of (D1+D2)/2. In the case that a distance between the center of the to-be-observed face m1 and an eyeball tracking camera at the bottom is k, the setting orientation b of the optical axis of the camera is:

$$b = \operatorname{atan}\left(\frac{D1 + D2}{2 * k}\right).$$

For the color camera, the shooting range need to cover the shooting ranges of all infrared camera. On the basis of a standard human face model, an average width of the human faces is 136 mm. Buffer regions of one human face width are respectively added on the left and right of the shooting region of the eyeball tracking camera to ensure that a RGB camera acquires a complete human face at the boundaries of the shooting region of the eyeball tracking camera. Based on above description, a width of horizontal shooting of the three eyeball tracking cameras at the position of 600 mm is 952 mm, and thus a width of horizontal shooting of the color camera is:

$$952 + 136 * 2 = 1224 \text{ mm};$$

and thus, the horizontal FOV of the color camera at the position of 600 mm is at least:

$$\operatorname{arctan}(1224/2/600) * 2 \approx 90°;$$

in hardware, the device for tracking eyeball in the embodiments of the present disclosure achieves the eye tracking of a horizontal range greater than 60° by three conventional infrared cameras and one conventional color camera, which is greatly beyond a tracking angle of about 30° of the device for tracking eyeball in the horizontal direction in some practices. In addition, the whole cost of the three conventional infrared cameras and one conventional color camera is less and is generally no more than one thousand yuan.

It should be noted that above illustrative embodiments show specific parameters of the device for tracking eyeballing, which are not limited in the embodiments of the present disclosure. That is, the device for tracking eyeballing is provided with other parameters in some other embodiments. For example, parameters, such as a number of the eyeball tracking cameras, a field of view of the eyeball tracking camera, a predetermined distance range of the eyeball tracking cameras for eyeball tracking, and the like are also other values.

Figure 6:
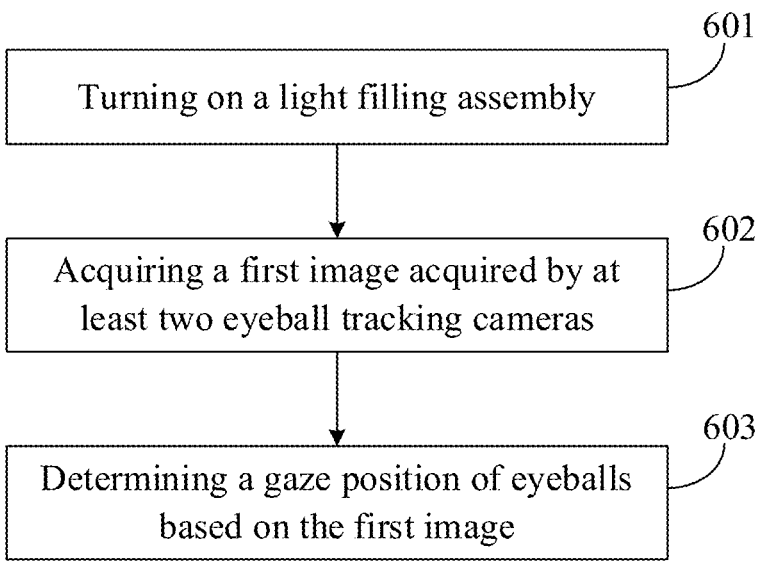
FIG. 6 is a flowchart of a method for tracking eyeballs according to some embodiments of the present disclosure.

FIG. 6 is a flowchart of a method for tracking eyeballs according to some embodiments of the present disclosure. The method for tracking eyeballs is applicable to the control assembly in the device for tracking eyeballs in above embodiments, and the method includes the following processes.

In S601, a light filling assembly is turning on.

In S602, a first image acquired by at least two eyeball tracking cameras is acquired.

In S603, a gaze position of the eyeballs is determined based on the first image.

In summary, in the method for tracking eyeballs in the embodiments of the present disclosure, a first image is acquired by at least two eyeball tracking cameras, and the gaze position of the eyeballs is determined based on the first image. As parts of the shooting ranges of the at least two eyeball tracking cameras are not overlapped, the at least two eyeball tracking cameras form a greater tracking range, and the control assembly determines the gaze position of the eyeballs within the greater tracking range, such that a problem of a less tracking range of the device for tracking eyeballs in some practices is solved, and an effect of increasing the tracking range of the device for tracking eyeballs is achieved.

Figure 7:
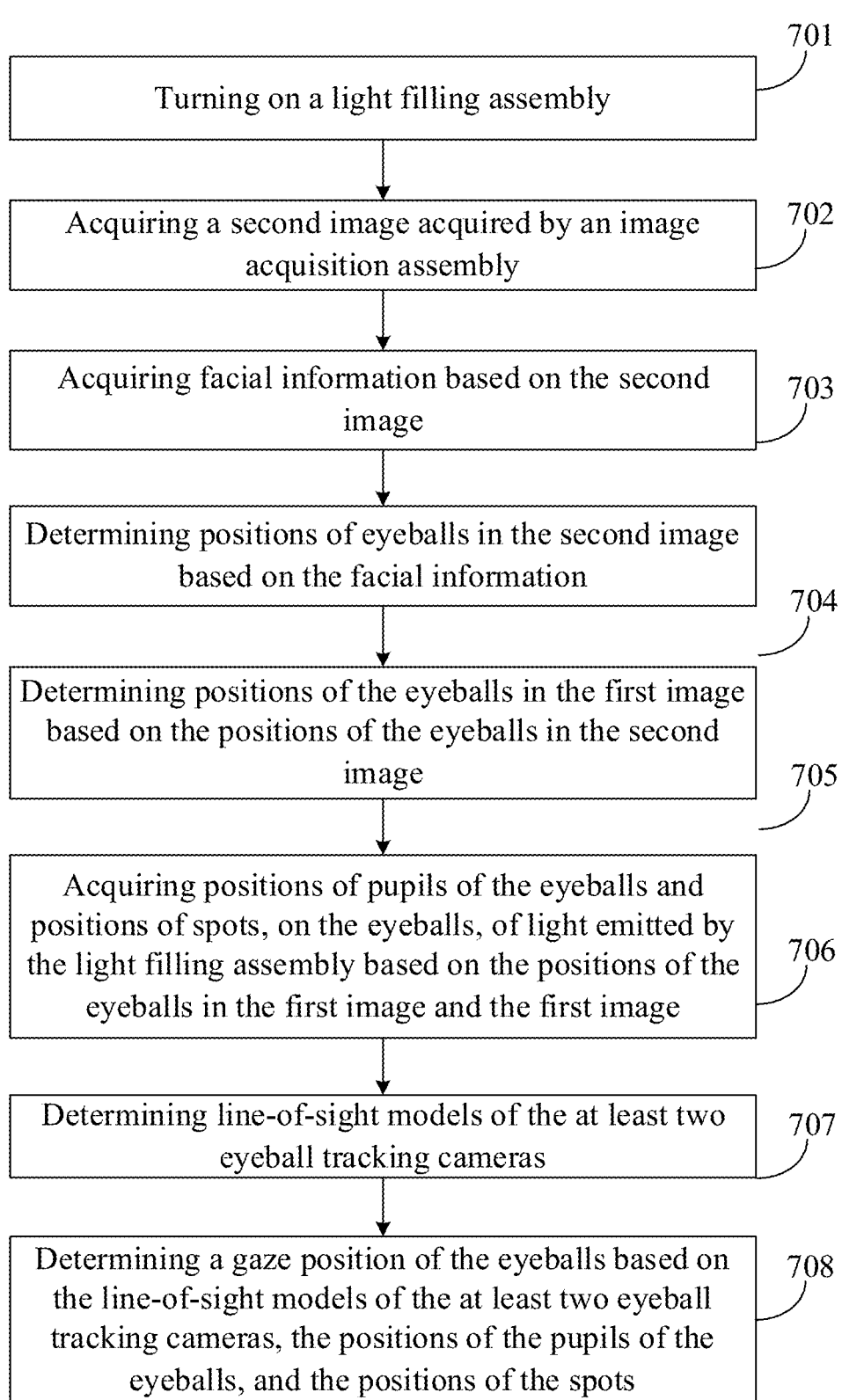
FIG. 7 is a flowchart of another method for tracking eyeballs according to some embodiments of the present disclosure.

FIG. 7 is a flowchart of another method for tracking eyeballs according to some embodiments of the present disclosure. The method for tracking eyeballs is applicable to the control assembly in the device for tracking eyeballs in above embodiments, and the method includes the following processes.

In S701, a light filling assembly is turning on.

In the light filling assembly, light emitted by the light filling assembly form a spot on the eyeball. As a position of the light filling assembly and the position of the eyeball tracking camera are known, the gaze position of the eyeballs is determined based on the position of the pupil of the eyeball and the position of the spot of the light emitted by the light filling assembly on the eyeball in the image acquired by the eyeball tracking camera, and the position of the light filling assembly and the eyeball tracking camera in some methods.

In some embodiments, the light filling assembly includes at least two light filling lamps disposed on different positions of the support. Light emitted by the light filling lamp form a spot on the eyeball. As a position of the light filling lamp and the position of the eyeball tracking camera are known, the gaze position of the eyeballs is determined based on the position of the pupil of the eyeball and the position of the spot of the light emitted by the light filling lamp on the eyeball in the image acquired by the eyeball tracking camera, and the position of the light filling lamp and the eyeball tracking camera in some methods. However, as positions and angles of the eyeballs, and the like, the image acquired by the eyeball tracking camera does not include the complete image of the eyeballs, such that the spot is loss, and then the gaze position of the eyeballs is not determined.

In the embodiments of the present disclosure, a plurality of light filling lamps are disposed, the plurality of light filling lamps are disposed on different positions, and thus a plurality of spots generated based on the light emitted by the plurality of light filling lamps on the eyeballs are located on different positions. A possibility of simultaneously losing the plurality of spots is less, and thus the possibility of successfully determining the gaze position of the eyeballs is improved.

In S702, a second image acquired by the image acquisition assembly is acquired.

The image acquisition assembly has a great shooting range, and the shooting ranges of the eyeball tracking cameras are within the shooting range of the image acquisition assembly.

In S703, facial information is acquired based on the second image.

As the shooting range of the image acquisition assembly is great, a possibility of including a complete human face in the second image acquired by the image acquisition assembly is great, and the facial information acquired based on the second image is more accurate. The facial information includes a position of the region of the human face in the second image.

Illustratively, the facial information in the second image is acquired by a face detection algorithm.

In S704, positions of the eyeballs in the second image are determined based on the facial information.

Upon the facial information being determined, the positions of the eyeballs in the second image are determined based on the facial information. The positions are marked in the form of eyeball coordinates. In addition, facial gesture coordinates are determined based on the facial information.

In S705, positions of the eyeballs in the first image are determined based on the positions of the eyeballs in the second image.

As the information, such as the positions of the eyeballs in the second image, is the parameters determined based on the coordinate system of the image acquisition assembly, and the first image is an image acquired by the eyeball tracking camera, a conversion of the coordinate system is performed first. The conversion process includes:

$$u_B = \frac{f_{xB}(u_A - U_A)}{f_{xA}} + U_B + \frac{f_{xB} * s}{z};$$

$$v_B = \frac{f_{yB}(v_A - V_A)}{f_{yA}} + V_B + \frac{f_{xB} * t}{z};$$

In above formula, an internal parameter matrix of the camera A (the camera A may be the image acquisition assembly) and the camera B (the camera A may be the eyeball tracking camera) is:

$$A = \begin{bmatrix} f_{xA} & 0 & U_A \\ 0 & f_{yA} & V_A \\ 0 & 0 & 1 \end{bmatrix};$$

$$B = \begin{bmatrix} f_{xB} & 0 & U_B \\ 0 & f_{yB} & V_B \\ 0 & 0 & 1 \end{bmatrix};$$

wherein z represents a distance between the eyeball and the to-be-observed face, s represents a distance between the camera A and the camera B in the horizontal direction, t represents a distance between the camera A and the camera B in the vertical direction, $(u_A, v_A)$ represents coordinates of an eyeball region in the camera A, $(u_B, v_B)$ represents coordinates of an eyeball region in the camera B, $f_{xA}$ represents a parameter related to a horizontal focal length of the camera A, and is also considered as a horizontal focal length of the camera A in the unit of one pixel, $f_{xB}$ is considered as a horizontal focal length of the camera B in the unit of one pixel, $f_{yA}$ is considered as a vertical focal length of the camera A in the unit of one pixel, $f_{yB}$ is considered as a vertical focal length of the camera B in the unit of one pixel, $U_A$ represents a parameter related to a horizontal resolution of the camera A and is about half of the horizontal resolution of the camera A, $V_A$ represents a parameter related to a vertical resolution of the camera A and is about half of the vertical resolution of the camera A, $U_B$ represents a parameter related to a horizontal resolution of the camera B and is about half of the horizontal resolution of the camera B, $V_B$ represents a parameter related to a vertical resolution of the camera B and is about half of the vertical resolution of the camera B.

As such, the positions of the eyeballs in the first image are determined.

In S706, positions of pupils of the eyeballs and positions of spots, on the eyeballs, of light emitted by the light filling assembly are acquired based on the positions of the eyeballs in the first image and the first image.

The process includes the following processes.

1) pupil detection.

Illustratively, the positions of pupils are acquired by performing the pupil detection using a method for deterring an adaptive threshold based on an accumulative gray histogram. The method includes the following processes.

1.1 gray histograms of a current eyeball region are acquired.

1.2 the acquired gray histograms are accumulated from small to large. As a gray value of the pupil region is less, an inflection point is defined between the gray value of the pupil region and the gray value of the non-pupil region in the accumulated gray histogram. The inflection point is denoted as a threshold of the current pupil region.

1.3 upon the threshold of the current pupil region being acquired, coordinates of a center of the pupil are acquired by performing binarization and elliptic fitting on the eyeball region. The coordinates of the center of the pupil are coordinates of the pupil.

In some embodiments, the coordinates of the center of the pupil are acquired in other manners, which is not limited in the embodiments of the present disclosure.

2) spot detection.

2.1 the spot detection is performed in an m*m pixel region around the coordinates of the pupil (the pixel region includes the coordinates of the pupil, and is taken the coordinates of the pupil as the center, a value of m is determined based on a radius of the pupil; for example, m is 80 in the case that the radius range of the pupil is 20-50 pixels). For the device for tracking eyeballs, the spot is generally near the pupil, and thus the precision and speed of the spot detection is improved in the case that the spot detection is performed in a range around the pupil.

2.2 a spot detection threshold is set as 200. The value is an empirical value. The spot image is acquired by performing binarization based on the threshold, and the coordinates of the center of the spot is acquired by elliptic fitting. The coordinates of the center of the spot is the position of the spot.

As a number of the eyeballs is generally two, the first image includes two eyeballs. Where the light filling assembly includes a plurality of light filling lamps, each light filling lamp forms one spot on the eyeball. On this basis, S706 includes:

acquiring, based on the positions of the two eyeballs in the first image and the first image, positions of pupils of the two eyeballs and positions of spots, on the two eyeballs, of light emitted by the at least two light filling lamps.

In S707, line-of-sight models of the at least two eyeball tracking cameras are acquired.

In the case that the line-of-sight models of the two eyeball tracking cameras are determined up to the current moment, the previously determined line-of-sight models are acquired directly. In the case that the line-of-sight models of the at least two eyeball tracking cameras are not determined up to the current moment, the line-of-sight models of the at least two eyeball tracking cameras are determined in this process.

The line-of-sight models of the at least two eyeball tracking cameras are configured to determine the gaze position of the eyeballs based on the positions of the pupils of the eyeballs and the positions of the spots in the first image acquired by the at least two eyeball tracking cameras.

As a number of the eyeballs is generally two, the first image includes two eyeballs. Where the light filling assembly includes a plurality of light filling lamps, the pupil of each eyeball and the spot generated by each light filling lamp correspond to one line-of-sight model for each eyeball tracking camera. For example, a number of the light filling lamps is n, and then there are 2n line-of-sight models for each light filling lamp.

Thus, S707 includes the following processes.

line-of-sight models corresponding to at least one sample data are determined based on each sample data.

The sample data includes a position of a pupil of one of the two eyeballs and a position of a spot on the one of the two eyeballs, and the line-of-sight models corresponding to the at least one sample data are line-of-sight models of the first eyeball tracking camera.

Determining, based on each sample data, the line-of-sight models corresponding to the at least one sample data includes the following processes.

1) the line-of-sight models of the first eyeball tracking camera are determined.

In the case that the line-of-sight models of the first eyeball tracking camera are determined, the display face of the display panel displays a predetermined content. For example, the display panel successively displays 9 calibration points. In the case that the first calibration point is displayed, the eyeballs focus on the point for a time (such as 2 seconds); in the case that the first calibration point disappears and a second calibration point is displayed, the same operation as the first calibration point is performed until all 9 calibration points are displayed. For each eyeball tracking camera, relative coordinates of the first spot of one of the two light filling lamps and the pupil generate 9 calibration data, and relative coordinates of the second spot of the other light filling lamp and the pupil also generate 9 calibration data. That is, each eyeball tracking camera generates four groups of calibration data (a first spot of the left eye—the pupil, a second spot of the left eye—the pupil, a first spot of the right eye—the pupil, a second spot of the right eye—the pupil).

The four groups of calibration data acquired by the first eyeball tracking camera are coordinates in the coordinate system of the first eyeball tracking camera, and the coordinates are converted to coordinates in a world coordinate system. For example, one conversion formula is:

$$Z_B \begin{bmatrix} u_B \\ v_B \\ 1 \end{bmatrix} = \begin{bmatrix} f_{xB} & 0 & u_B & 0 \\ 0 & f_{yB} & v_B & 0 \\ 0 & 0 & 1 & 0 \end{bmatrix} \begin{bmatrix} R_B & T_B \\ \vec{0} & 1 \end{bmatrix} \begin{bmatrix} x_w \\ y_w \\ z_w \\ 1 \end{bmatrix};$$

wherein $u_B$ and $v_B$ represent coordinates of the spot in the coordinate system of the first eyeball tracking camera, $R_B$ represents a rotation angle of the optical axis of the first eyeball tracking camera relative to the world coordinate axis, $T_B$ represents coordinate difference of origin of coordinates of the first eyeball tracking camera relative to origin of the world coordinate system (the origin of the world coordinate system is at a center of the display face, with +Y axis above, +X axis to the right, and +Z axis in front), $x_w$, $y_w$, $z_w$ represent coordinates of the spot in the world coordinate system;

$$\begin{bmatrix} f_{xB} & 0 & u_B & 0 \\ 0 & f_{yB} & v_B & 0 \\ 0 & 0 & 1 & 0 \end{bmatrix}$$

represents an internal parameter matrix of the first eyeball tracking camera. In the case that other eyeball tracking cameras are converted to be in the world coordinate system, some internal parameter matrixes are replaced by the internal parameter matrixes of corresponding eyeball tracking cameras. A method for converting the coordinates of the pupil is similar to the method, which is not repeated herein.

After the four groups of calibration data in the world coordinate system are acquired, the line-of-sight models of the first eyeball tracking camera are acquired based on the four groups of calibration data.

In some embodiments, the line-of-sight model uses a polynomial regression model shown in the following:

$$\begin{cases} X_G = a_0 + a_1 x + a_2 y + a_3 xy + a_4 x^2 + a_5 y^2 \\ Y_G = b_0 + b_1 x + b_2 y + b_3 xy + b_4 x^2 + b_5 y^2 \end{cases};$$

wherein $X_G$ and $Y_G$ represent the coordinates of the gaze position of the pupil in the world coordinate system, $a_0$, $a_1$, $a_2$, $a_3$, $a_4$, $a_5$, $b_0$, $b_1$, $b_2$, $b_3$, $b_4$, $b_5$ are unknown parameters and acquired based on the above four groups of calibration data, and x and y are relative coordinates of the spot and the pupil.

Four line-of-sight models of the first eyeball tracking camera are acquired by substituting the four groups of calibration data corresponding to the eyeball tracking camera into the eyeball tracking camera.

2) line-of-sight models of other eyeball tracking cameras are determined based on relative positions of the line-of-sight models of the first eyeball tracking camera and other eyeball tracking cameras.

The line-of-sight models of the first eyeball tracking camera are converted to the line-of-sight models of other eyeball tracking cameras by converting the coordinates. For example, a converting relationship of the coordinates in the coordinate system of the first eyeball tracking camera and coordinates in a coordinate system of a second eyeball tracking camera (the second eyeball tracking camera is any eyeball tracking camera in the at least two eyeball tracking cameras other than the first eyeball tracking camera), and one coordinate converting relationship is:

$$u_{Bn} = \frac{f_{xBn}(u_{B2} - U_{B2})}{f_{xB2}} + U_{Bn} + \frac{f_{xBn} * s}{z};$$

$$v_{Bn} = \frac{f_{yBn}(v_{B2} - V_{B2})}{f_{yB2}} + V_{Bn} + \frac{f_{yBn} * t}{z};$$

wherein $u_B$ and $v_B$ represent coordinates of the spot in the coordinate system of the second eyeball tracking camera, $u_{B2}$ and $v_{B2}$ represent coordinates of the image in the first eyeball tracking camera, similar to above embodiments, $f_{xBn}$ represents a horizontal focal length of the second eyeball tracking camera, $f_{yBn}$ represents a vertical focal length of the second eyeball tracking camera, $f_{yB2}$ represents a vertical focal length of the first eyeball tracking camera, $f_{xB2}$ represents a horizontal focal length of the first eyeball tracking camera, $U_{B2}$ represents a parameter related to a horizontal resolution of the first eyeball tracking camera and is about half of the horizontal resolution of the first eyeball tracking camera, $V_{B2}$ represents a parameter related to a vertical resolution of the first eyeball tracking camera and is about half of the vertical resolution of the first eyeball tracking camera, s represents a distance between the first eyeball tracking camera and the second eyeball tracking camera in the horizontal direction, t represents a distance between the first eyeball tracking camera and the second eyeball tracking camera in the vertical direction, and an internal parameter matrix of the first eyeball tracking camera B2 and the second eyeball tracking camera Bn is:

$$B2 = \begin{bmatrix} f_{xB2} & 0 & U_{B2} \\ 0 & f_{yB2} & V_{B2} \\ 0 & 0 & 1 \end{bmatrix};$$

$$Bn = \begin{bmatrix} f_{xBn} & 0 & U_{Bn} \\ 0 & f_{yBn} & V_{Bn} \\ 0 & 0 & 1 \end{bmatrix}.$$

A converting relationship of the coordinates in the coordinate system of the second eyeball tracking camera and the coordinates in the world coordinate system is determined by the internal parameter matrix and above method for converting to the world coordinate system. Then, the line-of-sight models of each eyeball tracking camera are determined based on the converting relationship and the above four groups of calibration data.

In S708, the gaze position of the eyeballs is determined based on the line-of-sight models of the at least two eyeball tracking cameras, the positions of the pupils of the eyeballs, and the positions of the spots.

S708 further includes the following processes.

1) at least one gaze position of the eyeballs is determined based on the line-of-sight models of the at least two eyeball tracking cameras.

As the spot is possibly failed to be acquired, then the gaze position is not acquired by each eyeball tracking camera. Thus, in the embodiments of the present disclosure, at least one gaze position of the eyeballs is determined based on the line-of-sight models of the at least two eyeball tracking cameras.

2) a target gaze position is determined based on the at least one gaze position.

In the case that a number of the gaze positions is 1, the gaze position is determined as the target gaze position.

In the case that the number of the gaze positions is greater than or equal to 2, the gaze position is determined based on an average value of coordinates of the plurality of gaze positions.

As such, the accuracy of determined target gaze position is improved.

In some embodiments, as a number of the eyeball tracking cameras is multiple in the device for tracking eyeballs applying the method for tracking eyeballs, at least two eyeball tracking cameras are turned on in performing the method for tracking eyeballs. For example, in the case that the eyeball is within a shooting range of an eyeball tracking camera, the eyeball tracking camera and eyeball tracking cameras adjacent to the eyeball tracking camera are turned on, and the remaining eyeball tracking cameras are not turned on, such that the power consumption of the device for tracking eyeballs is saved on the premise that the function of tracking eyeballs is achieved normally.

For example, the device for tracking eyeballs includes five eyeball tracking cameras that are arranged horizontally. In this case, the central eyeball tracking camera and two adjacent eyeball tracking cameras are turned on in the case that the eyeballs are within the shooting range of the central eyeball tracking camera, and two outside eyeball tracking cameras are not turned on, such that the power consumption of two eyeball tracking cameras is saved, and the function of tracking eyeballs is achieved without being affected.

In summary, in the method for tracking eyeballs in the embodiments of the present disclosure, a first image is acquired by at least two eyeball tracking cameras, and the gaze position of the eyeballs is determined based on the first image. As parts of the shooting ranges of the at least two eyeball tracking cameras are not overlapped, the at least two eyeball tracking cameras form a greater tracking range, and the control assembly determines the gaze position of the eyeballs within the greater tracking range, such that a problem of a less tracking range of the device for tracking eyeballs in some practices is solved, and an effect of increasing the tracking range of the device for tracking eyeballs is achieved.

Figure 8:
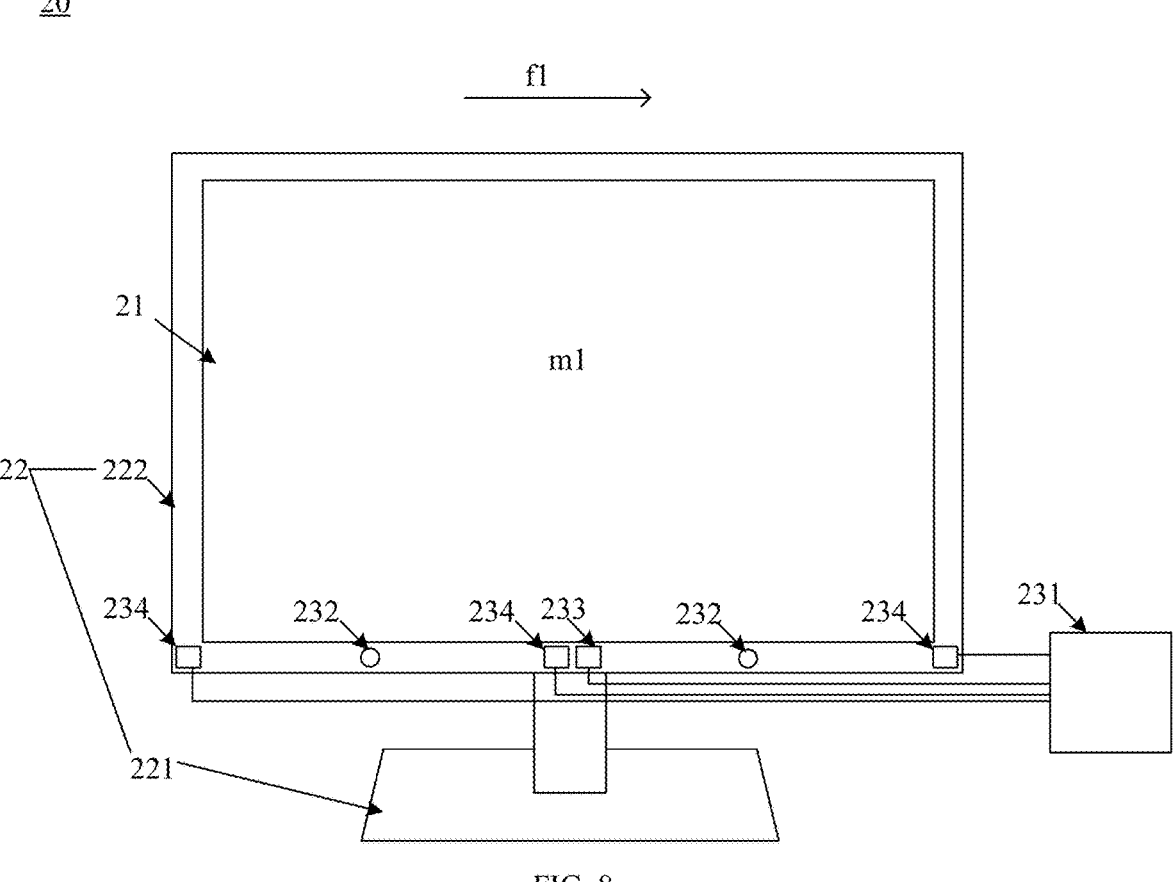
FIG. 8 is a schematic structural diagram of a display device according to some embodiments of the present disclosure.

In some embodiments of the present disclosure, as shown in FIG. 8, a display device 20 is further provided in the embodiments of the present disclosure. The display device 20 includes: a display panel 21, a housing 22, and a device for tracking eyeballs 23.

The device for tracking eyeballs 23 includes: a control assembly 231, a light filling assembly 232, an image acquisition assembly 233, and at least two eyeball tracking cameras 234.

The light filling assembly 232, the image acquisition assembly 233, and the at least two eyeball tracking cameras 234 are disposed on the housing 22 and face towards a light emitting direction of the display panel 21, and the at least two eyeball tracking cameras 234 are disposed on at least two different positions of the housing 22.

The control assembly 231 is electrically connected to the at least two eyeball tracking cameras 234.

A support of the device for tracking eyeballs in above embodiments is combined on the housing of the display device, for example, is integrated with the housing or disposed on the housing.

In some embodiments, the at least two eyeball tracking cameras 234 are disposed on the housing 22 and under the display panel 21, and arranged in a horizontal direction f1.

In some embodiments, a display face m1 of the display panel 21 is rectangular, an edge of the display face m1 is parallel to the horizontal direction f1.

In the at least two eyeball tracking cameras 234, distances between any two adjacent eyeball tracking cameras 234 are equal.

In some embodiments, the at least two eyeball tracking cameras 234 and the display face m1 of the display panel 21 are coplanar, a number of the eyeball tracking cameras 234 is three, the distance between two adjacent eyeball tracking cameras 234 of the three eyeball tracking cameras 234 meets:

$$\begin{cases} 2*\tan\left(\frac{\alpha}{2}\right)*D1 + 2*L \geq W1 \\ 2*\tan\left(\frac{\alpha}{2}\right)*D2 + 2*L \geq W2 - e*2; \\ 2*\tan\left(\frac{\alpha}{2}\right)*D1 - L \geq p \end{cases}$$

wherein L is used to determine the distance, p is determined based on a width of the eyeball, e is determined based on a distance between two eyeballs, $\alpha$ represents a horizontal field of view of the eyeball tracking camera, D1 and D2 respectively represent a minimum distance and a maximum distance between a predetermined target region for eyeball tracking of the eyeball tracking camera and the display face in a direction perpendicular to the display face; wherein $$W1 = 2 * \tan\left(\frac{\theta}{2}\right) * D1, \text{ and } W2 = 2 * \tan\left(\frac{\theta}{2}\right) * D2,$$

wherein $\theta$ represents a whole horizontal field of view of the three predetermined eyeball tracking cameras.

In some embodiments, optical axes of the three eyeball tracking cameras 234 are parallel and coplanar, a first plane determined based on the optical axes of the three eyeball tracking cameras is intersected with a vertical line running through a center of the display face m1, and an intersection point is within the predetermined target region.

In some embodiments, the intersection point is at a center of the target region in the direction perpendicular to the display face, and the eyeball tracking camera meets:

$$b = \operatorname{atan}\left(\frac{D1 + D2}{2 * k}\right);$$

wherein b is used to determine an included angle between the optical axis of the eyeball tracking camera and the display face, and k represents a distance between the center of the display face and the eyeball tracking camera in a vertical direction.

In some embodiments, the image acquisition assembly 233 is disposed on the housing 22 and under the display panel 21, and distances between the image acquisition assembly and two ends of lower edges of the display face m1 are equal. That is, the image acquisition assembly 233 is disposed on a middle of the lower edges of the display face m1, such that the shooting range of the image acquisition assembly 233 covers the shooting ranges of the eyeball tracking cameras 234.

In some embodiments, the housing 22 includes a base 221 and a frame body 222 disposed on the base 221, and the light filling assembly 232, the image acquisition assembly 233, and the at least two eyeball tracking cameras 234 are disposed on the frame body 222.

The control assembly 231 includes a processor of the display device. For example, in the case that the display device is a desktop display device, the control assembly 231 is disposed in the host of the desktop display device.

The display panel is a liquid crystal display panel, an organic light emitting diode display panel, or other display panel.

The display device is a desktop display, a vertical display, and the like, and is used to determine the gaze position of eyeballs in displaying the image.

In addition, for the content of the device for tracking eyeballs in the display device, references may be made to above embodiments, which is not repeated herein.

In summary, in the display device in the embodiments of the present disclosure, at least two eyeball tracking cameras are disposed, and parts of the shooting ranges of the at least two eyeball tracking cameras are not overlapped. Then, the at least two eyeball tracking cameras form a greater tracking range, and the control assembly determines the gaze position of the eyeballs within the greater tracking range, such that a problem of a less tracking range of the device for tracking eyeballs in some practices is solved, and an effect of increasing the tracking range of the device for tracking eyeballs is achieved.

It can be understood by persons of ordinary skill in the art that all or part of above embodiments are achieved by hardware or by programs instructing the relevant hardware, and the programs are stored in a computer-readable storage medium, such as a read-only memory, a disk, an optical disc, and the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A device for tracking eyeballs, comprising: a support, a control assembly, a light filling assembly, an image acquisition assembly, and at least two eyeball tracking cameras; wherein the at least two eyeball tracking cameras are disposed on at least two different positions of the support, and at least parts of shooting ranges of the at least two eyeball tracking cameras are not overlapped;

the light filling assembly and the image acquisition assembly are disposed on the support, wherein the image acquisition assembly is disposed on a lower portion of the support, the shooting ranges of the at least two eyeball tracking cameras are within a shooting range of the image acquisition assembly, and a gap is defined between edges of the shooting ranges of the at least two eyeball tracking cameras and an edge of the shooting range of the image acquisition assembly, wherein a size of the gap is greater than a size of a predetermined human face, the image acquisition assembly comprises a color camera, and the eyeball tracking camera comprises an infrared camera;

the control assembly is electrically connected to the at least two eyeball tracking cameras and the image acquisition assembly, and is configured to determine a gaze position of the eyeballs within the shooting ranges of the at least two eyeball tracking cameras;

the control assembly is configured to determine the gaze position, within the shooting ranges of the at least two eyeball tracking cameras, of the eyeballs, whose distance from a to-be-observed face meets a predetermined distance range, on the to-be-observed face;

the at least two eyeball tracking cameras are disposed at a lower portion of the support and arranged in a horizontal direction, optical axes of the at least two eyeball tracking cameras are parallel and coplanar, a first plane determined based on the optical axes of the at least two eyeball tracking cameras is intersected with a vertical line running through a center of the to-be-observed face, and an intersection point is at a center of the predetermined distance range; and a field of view of the image acquisition assembly is greater than a field of view of any of the at least two eyeball tracking cameras, and at a position having a smallest vertical distance to the to-be-observed face in the predetermined distance range and at a position having a largest vertical distance to the to-be-observed face in the predetermined distance range, regions capable of being shot by the image acquisition assembly are greater than regions capable of being shot by the at least two eyeball tracking cameras.

2. The device for tracking eyeballs according to claim 1, wherein in the at least two eyeball tracking cameras, an overlapping region is defined between the shooting ranges of two adjacent eyeball tracking cameras.

3. The device for tracking eyeballs according to claim 2, wherein a size of the overlapping region is greater than a size of predetermined eyeballs.

4. The device for tracking eyeballs according to claim 1, wherein the support comprises a mounting portion for disposing the to-be-observed face.

5. The device for tracking eyeballs according to claim 4, wherein
   the to-be-observed face is a display face of a display panel, and the support comprises the mounting portion for disposing the display panel.

6. The device for tracking eyeballs according to claim 1, wherein the light filling assembly comprises at least two light filling lamps disposed on different positions of the support.

7. The device for tracking eyeballs according to claim 6, wherein the at least two light filling lamps are arranged in a horizontal direction on the support.

8. The device for tracking eyeballs according to claim 1, wherein a resolution of the color camera is less than a resolution of the infrared camera.

9. A method for tracking eyeballs, applicable to a control assembly of a device for tracking eyeballs, wherein the device for tracking eyeballs comprises: a support, a light filling assembly, an image acquisition assembly, and at least two eyeball tracking cameras; wherein the at least two eyeball tracking cameras are disposed on at least two different positions of the support, and at least parts of shooting ranges of the at least two eyeball tracking cameras are not overlapped; the light filling assembly and the image acquisition assembly are disposed on the support, wherein the image acquisition assembly is disposed on a lower portion of the support, the shooting ranges of the at least two eyeball tracking cameras are within a shooting range of the image acquisition assembly, and a gap is defined between edges of the shooting ranges of the at least two eyeball tracking cameras and an edge of the shooting range of the image acquisition assembly, wherein a size of the gap is greater than a size of a predetermined human face, the image acquisition assembly comprises a color camera, and the eyeball tracking camera comprises an infrared camera; and the control assembly is electrically connected to the at least two eyeball tracking cameras and the image acquisition assembly; wherein the control assembly is configured to determine the gaze position, within the shooting ranges of the at least two eyeball tracking cameras, of the eyeballs, whose distance from a to-be-observed face meets a predetermined distance range, on the to-be-observed face; the at least two eyeball tracking cameras are disposed at a lower portion of the support and arranged in a horizontal direction, optical axes of the at least two eyeball tracking cameras are parallel and coplanar, a first plane determined based on the optical axes of the at least two eyeball tracking cameras is intersected with a vertical line running through a center of the to-be-observed face, and an intersection point is at a center of the predetermined distance range; and a field of view of the image acquisition assembly is greater than a field of view of any of the at least two eyeball tracking cameras, and at a position having a smallest vertical distance to the to-be-observed face in the predetermined distance range and at a position having a largest vertical distance to the to-be-observed face in the predetermined distance range, regions capable of being shot by the image acquisition assembly are greater than regions capable of being shot by the at least two eyeball tracking cameras;
   the method comprising:
      turning on the light filling assembly;
      acquiring a first image acquired by the at least two eyeball tracking cameras; and
      determining a gaze position of the eyeballs based on the first image;
   wherein prior to determining the gaze position of the eyeballs based on the first image, the method further comprises:
      acquiring a second image acquired by the image acquisition assembly;
      acquiring facial information based on the second image; and
      determining positions of the eyeballs in the second image based on the facial information; and
   determining the gaze position of the eyeballs based on the first image comprises:
      determining positions of the eyeballs in the first image based on the positions of the eyeballs in the second image; and
      determining the gaze position of the eyeballs based on the positions of the eyeballs in the first image and the first image.

10. The method according to claim 9, wherein determining the gaze position of the eyeballs based on the positions of the eyeballs in the first image and the first image comprises:
   acquiring, based on the positions of the eyeballs in the first image and the first image, positions of pupils of the eyeballs and positions of spots, on the eyeballs, of light emitted by the light filling assembly;
   acquiring line-of-sight models of the at least two eyeball tracking cameras, wherein the line-of-sight models of the at least two eyeball tracking cameras are configured to determine the gaze position of the eyeballs based on the positions of the pupils of the eyeballs and the positions of the spots in the first image acquired by the at least two eyeball tracking cameras; and
   determining the gaze position of the eyeballs based on the line-of-sight models of the at least two eyeball tracking cameras, the positions of the pupils of the eyeballs, and the positions of the spots.

11. The method according to claim 10, wherein determining the gaze position of the eyeballs based on the line-of-sight models of the at least two eyeball tracking cameras, the positions of the pupils of the eyeballs, and the positions of the spots comprises:
   determining at least one gaze position of the eyeballs based on the line-of-sight models of the at least two eyeball tracking cameras; and
   determining a target gaze position based on the at least one gaze position.

12. The method according to claim 10, wherein
   the first image is an image acquired by a first eyeball tracking camera in the at least two eyeball tracking cameras, the light filling assembly comprises at least two light filling lamps disposed on different positions of the support, and the first image comprises two eyeballs; and
   acquiring, based on the positions of the eyeballs in the first image and the first image, the positions of the pupils of the eyeballs and the positions of the spots, on the eyeballs, of the light emitted by the light filling assembly comprises:

acquiring, based on positions of the two eyeballs in the first image and the first image, positions of pupils of the two eyeballs and positions of spots, on the two eyeballs, of light emitted by the at least two light filling lamps; and acquiring the line-of-sight models of the at least two eyeball tracking cameras comprises:

determining, based on each sample data, line-of-sight models corresponding to at least one sample data, wherein the sample data comprises a position of a pupil of one of the two eyeballs and a position of a spot on the one of the two eyeballs, and the line-of-sight models corresponding to the at least one sample data are line-of-sight models of the first eyeball tracking camera in the at least two eyeball tracking cameras.

13. A display device, comprising: a display panel, a housing, and a device for tracking eyeballs, wherein the device for tracking eyeballs comprises: a support, a control assembly, a light filling assembly, an image acquisition assembly, and at least two eyeball tracking cameras;

wherein the light filling assembly, the image acquisition assembly, and the at least two eyeball tracking cameras are disposed on the housing and face towards a light emitting direction of the display panel, the at least two eyeball tracking cameras are disposed on at least two different positions of the housing, and the control assembly is electrically connected to the at least two eyeball tracking cameras and the image acquisition assembly; and the light filling assembly and the image acquisition assembly are disposed on the support, wherein the image acquisition assembly is disposed on a lower portion of the support, the shooting ranges of the at least two eyeball tracking cameras are within a shooting range of the image acquisition assembly, and a gap is defined between edges of the shooting ranges of the at least two eyeball tracking cameras and an edge of the shooting range of the image acquisition assembly, wherein a size of the gap is greater than a size of a predetermined human face, the image acquisition assembly comprises a color camera, and the eyeball tracking camera comprises an infrared camera;

wherein the control assembly is configured to determine the gaze position, within the shooting ranges of the at least two eyeball tracking cameras, of the eyeballs, whose distance from a to-be-observed face meets a predetermined distance range, on the to-be-observed face;

the at least two eyeball tracking cameras are disposed at a lower portion of the support and arranged in a horizontal direction, optical axes of the at least two eyeball tracking cameras are parallel and coplanar, a first plane determined based on the optical axes of the at least two eyeball tracking cameras is intersected with a vertical line running through a center of the to-be-observed face, and an intersection point is at a center of the predetermined distance range; and a field of view of the image acquisition assembly is greater than a field of view of any of the at least two eyeball tracking cameras, and at a position having a smallest vertical distance to the to-be-observed face in the predetermined distance range and at a position having a largest vertical distance to the to-be-observed face in the predetermined distance range, regions capable of being shot by the image acquisition assembly are greater than regions capable of being shot by the at least two eyeball tracking cameras.

14. The display device according to claim 13, wherein the at least two eyeball tracking cameras are disposed on the housing and under the display panel, and arranged in a horizontal direction.

15. The display device according to claim 13, wherein the image acquisition assembly is disposed on the housing and under the display panel, and distances between the image acquisition assembly and two ends of lower edges of the display face are equal.

16. The display device according to claim 13, wherein the housing comprises a base and a frame body disposed on the base, and the light filling assembly, the image acquisition assembly, and the at least two eyeball tracking cameras are disposed on the frame body.

* * * * *